United States Patent [19]
Lundgren

[11] 3,882,580
[45] May 13, 1975

[54] CUTTING INSERT
[75] Inventor: Evert Gustav Lundgren, Sandviken, Sweden
[73] Assignee: Sandvik Aktiebolag, Sandviken, Sweden
[22] Filed: Nov. 23, 1973
[21] Appl. No.: 418,219

[30] Foreign Application Priority Data
Jan. 8, 1973 Sweden .................. 7300187

[52] U.S. Cl. .................................. 29/95 R
[51] Int. Cl. .................................. B26d 1/00
[58] Field of Search .......... 29/95, 96, 105 A, 105 R

[56] References Cited
UNITED STATES PATENTS

| | | | |
|---|---|---|---|
| 2,164,303 | 7/1939 | Berg et al. | 29/95 |
| 2,434,190 | 3/1969 | Kaiser | 29/95 |
| 3,052,951 | 9/1962 | Kubota | 29/95 |
| 3,395,434 | 8/1968 | Wirfelt | 29/95 |
| 3,497,933 | 3/1970 | Okada | 29/95 |
| 3,559,260 | 2/1971 | Fine | 29/95 |
| 3,762,005 | 10/1973 | Erkfritz | 29/95 |

FOREIGN PATENTS OR APPLICATIONS

| | | | |
|---|---|---|---|
| 315,005 | 10/1919 | Germany | 29/95 |
| 1,099,534 | 3/1955 | France | 29/95 |

*Primary Examiner*—Harrison L. Hinson
*Attorney, Agent, or Firm*—Pierce, Scheffler & Parker

[57] ABSTRACT

In a cutting insert having a cutting corner and associated cutting edge, together with a chip-breaking groove in the chip face of the insert, the improvement consists in giving a part of the cutting edge and associated chip-breaker a smaller rake angle than that of that part of the insert which is essentially active during a cutting operation.

3 Claims, 8 Drawing Figures $\gamma_1 > \gamma_2$ $\gamma_3 > \gamma_4$ $\gamma_5 > \gamma_6$

CUTTING INSERT

The present invention relates to cutting inserts for chip-forming machining of preferably metal work-pieces and, in particular, to indexable inserts having at least one cutting edge. The inserts may have triangular, square, rhombic, rhomboidal or other form.

It is known to provide such inserts with chip-breakers in the form of grooves alongside the cutting edges, the grooves being formed in a major face or a chip face of the insert, e.g., a surface of the insert over which is to run a chip taken from a work-piece by the associated cutting edge. The cross-section of each such chip-breaker may comprise one or more steps or parts. The cutting edge with associated chip-breaker may be straight and parallel with the faces of the insert, or straight and oblique in relation to the top respectively bottom faces of the insert, or they may describe a curve composed of straight and/or arcuate parts, lying in the plane of the minor or clearance face of the insert.

A general problem during chipforming machining is that the chip hits and damages the free part of the cutting edge, which part does not participate in the cutting. In order to obtain small cutting forces which reduce the power consumption and the risks of vibrations during the machining, the cutting edges are given a positive top rake (or rake angle) as large as possible.

An increase of the top rake means a weakening of the cutting edge, however, because the cutting edge angle or nose angle is decreased at the same time. The part of the cutting edge being in action is not subjected to any considerable load increase because an increase of the top rake means at the same time that the cutting forces and the load upon the cutting edge are decreased. The load caused by the chip beating upon the free cutting edge of the insert is not influenced in a corresponding way by the size or range of the top rake (rake angle). Instead, the load and the damage upon the free cutting edge increase with increasing top rake.

The present invention provides a strengthening of the normally free part of the cutting edge whilst at the same time the top rake can be increased favorably in the part of the cutting edge normally in action. This means that the form of the insert can be optimum with regard to chip breaking, as well as with regard to cutting forces and to edge strength, in a way which earlier had not been possible.

During the greater part of a cutting operation only the part of the cutting edge being next to the corner or nose radius of the insert is normally in action. The length of this part is seldom above one third of the total length of the cutting edge. The rest of the cutting edge is only temporarily in action, — for example, at shoulders of the work-piece or in facing or transverse turning.

The cutting insert according to the invention is characterized in that the part of the cutting edge and associated chip-breaker groove which is in action only temporarily, — that means usually the middle part of the insert - is formed with a smaller top rake angle than the rest of the insert, and/or is provided with a negative strengthening face which may also be combined with a land or plain face. It is also essential that the mentioned top rake or rake angle decreases continuously, and/or the width of the mentioned face or faces increases continuously in the direction from the cutting corner within a significant transition range which starts on the cutting edge outside the nose radius of the corner at a distance of one-fourth to one-third of the total length of the insert side.

Some exemplary embodiments of the invention will now be described with reference to the accompanying drawing, in which.

Figure 2:
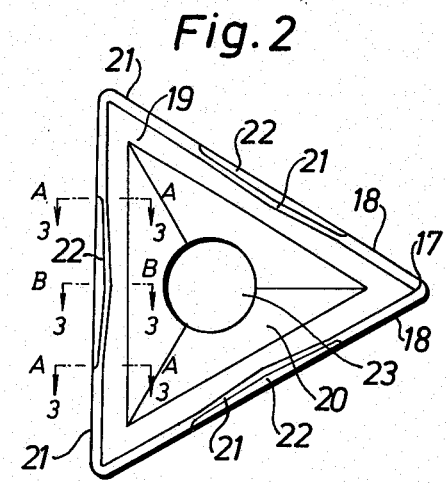
FIG. 2 is a plan view showing a triangular cutting insert according to the invention.
Figure 3:
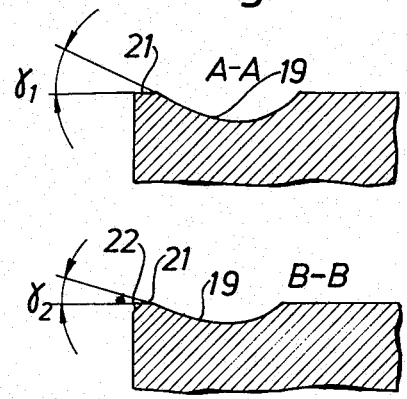
Figure 4:
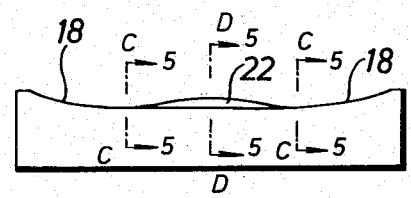
Figure 5:
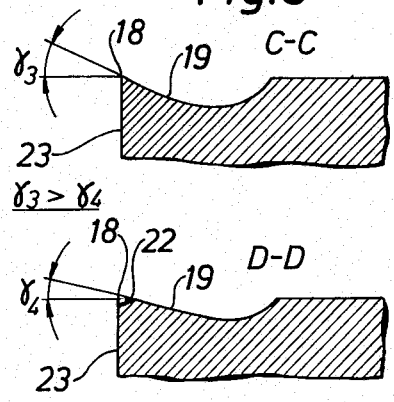
Figure 6:
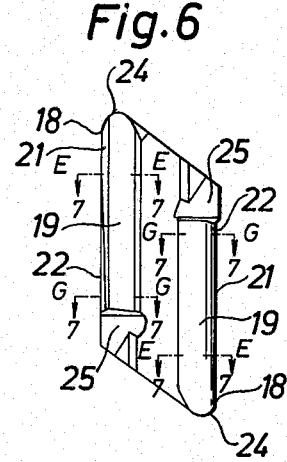
Figure 7:
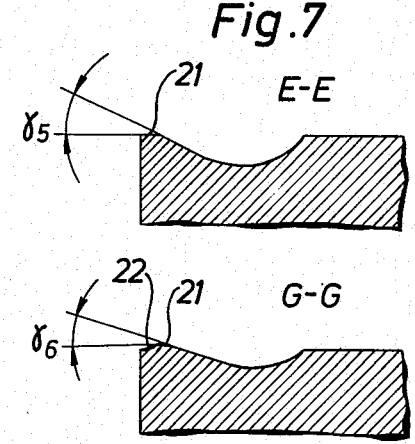
Figure 8:
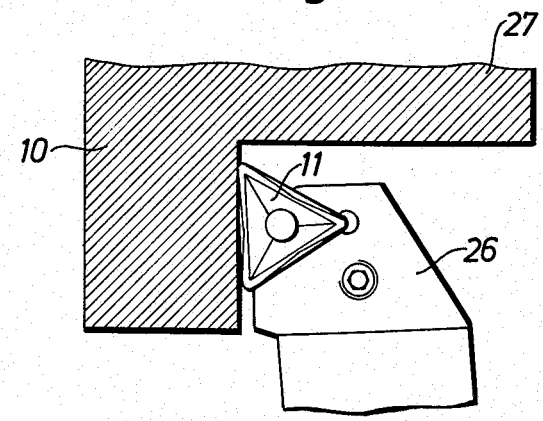

FIG. 3 includes two sectional views indicated by line A—A respectively line B—B on FIG. 2, showing two profiles of the chipbreaker;

FIG. 4 is a side elevational view showing a cutting insert in which the cutting edge describes a curve composed of arcuate parts in the plane of the minor or clearance face;

FIG. 5 consists of sectional views indicated by line C—C respectively line D—D on FIG. 4 showing profiles of the chip-breaker;

FIG. 6 is a plan view showing a rhomboidal insert according to the invention;

FIG. 7 consists of sectional views indicated by line E—E respectively line G—G on FIG. 6 showing profiles of the chip-breaker; and FIG. 8 is a plan view showing a facing or transverse turning operation in which the whole cutting edge is in action.

Figure 1:
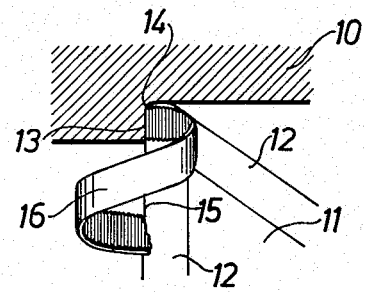
FIG. 1 is a plan view showing the normal case in which only the part of the cutting edge next to the insert or cutting corner is in action and the outside or free part of the cutting edge is exposed to chip beating.

Referring to the drawing, FIG. 1 shows as a principle a conventional cutting of a work-piece 10 by means of a cutting insert 11 provided with a chip-breaker 12. Only that part 13 of the cutting edge next to the insert corner 14 is in action, while the outside or free part 15 of the cutting edge is exposed to beating by a chip 16.

FIG. 2 shows a triangular insert with cutting corners 17 and connecting cutting edges 18. Along the cutting edges there are chip-breakers in the form of grooves 19 surrounding a central part 20 of the insert. In the connection between chip-breaker and cutting edge, the insert is provided with a plain face or land 21. The middle of the cutting edge is, moreover, provided with a negative strengthening face 22. The insert has also a central hole 23 for clamping and locating the cutting insert in a tool holder. The insert is symmetrical on both sides of the section 3B—3B, which means that the rake angle $\gamma$ (top rake) increases continuously and the width of the negative strengthening face decreases continuously on both sides of the section 3B—3B in the direction towards the section 3A—3A (compare FIG. 3).

FIG. 3 shows two profiles of the chip-breaker 19 at sections A—A and B—B. The width of the negative strengthening face 22 in the section B—B decreases continuously in the direction towards the section A—A in which the width is zero, the face thus having disappeared.

The embodiment disclosed in FIGS. 2 and 3 is one in which the insert has a land or plain face 21 along all cutting edges.

FIG. 4 shows an embodiment in which a cutting edge 18 and associated chip-breaker 19 describe a curve composed of arcuate parts in the plane of the clearance or minor face.

FIG. 5 shows profiles of the chip-breaker 19 in the section C—C and D—D in FIG. 4. In this embodiment there is shown an alternative form in which the cutting edge 18 does not have any plain face but rather connects directly to a negative strengthening face 22 between sections D—D and C—C (compare FIG. 4). Outside the section C—C, in the direction towards or next to the insert corners, a chip-breaker or chip face 19 connects directly with a clearance face 23 without any intermediate plain face (compare section C—C).

FIGS. 6 and 7 show a rhomboidal cutting insert which has cutting corners only in the pointed insert corners 24. Along the cutting edges 18 there are chip-breaker grooves 19, and in the connection between chip-breaker and cutting edge the insert is provided with a plain face or land 21. The insert has, moreover, particular faces 25 designed with regard to its clamping in a tool holder. In this embodiment, the rake angle $\gamma 5$ decreases, and the width of the negative strengthening face 22 increases continuously, in the direction from the cutting corner, from the section E—E along the whole length of the cutting edge. Alternatively, the continuous change can cease earlier and said face width respectively rake angle can be constant in that part which is outermost, counted from the cutting corner.

FIG. 8 shows a so-called "facing or transverse turning," in which operation the whole cutting edge of the cutting insert is in action. This case is thus principally an "exception" to the normal type of cutting, at which the cutting insert according to the invention has its greatest importance. The feeding direction of the insert 11 placed in tool holder 26 is out-turned in relation to axis 27 of the rotation of the work-piece 10 and almost parallel with the cutting edge. In such facing operations the demands upon small cutting forces are not as great as in the normal case, however.

I claim:

1. In a cutting insert, for chipforming machining of preferably metal work-pieces, having at least one cutting corner (17, 24) from which extends one or more cutting edges (18) provided with a chip-breaker in the form of a groove (19) alongside the cutting edge, the groove being formed in a major or chip face of the insert, only a part (13, 14) of the cutting edge, which part comprises the cutting corner and the adjacent area, normally being engaged with the work-piece (10) during the greater part of the cutting operation, the improvement wherein the insert is strengthened which improvement consists essentially in that that part of the edge which is not engaged has a smaller rake angle (top rake) $\gamma$ than the part of the insert edge that is essentially active during the cutting operation and in that said rake angle $\gamma$ decreases continuously along the cutting edge in the direction from the cutting corner within a significant transition range starting at a distance from the corner of one-fourth to one-third of the total length of the insert side.

2. In a cutting insert, for chipforming machining of preferably metal work-pieces, having at least one cutting corner (17, 24) from which extends one or more cutting edges (18) provided with a chip-breaker in the form of a groove (19) alongside the cutting edge, the groove being formed in a major or chip face of the insert, only a part (13, 14) of the cutting edge, which part comprises the cutting corner and the adjacent area, normally being engaged with the work-piece (10) during the greater part of the cutting operation, the improvement wherein the insert is strengthened which improvement consists essentially in providing that part of the edge which is not engaged with a negative strengthening face (22) and in continuously decreasing the rake angle along the cutting edge in the rake angle $\gamma$ decreases continuously along the cutting edge in the direction from the cutting corner within a significant transition range starting at a distance from the corner of one-fourth to one-third of the total length of the insert side.

3. Cutting insert according to claim 1, in which the width of the negative strengthening face increases continuously in the direction from the cutting corner a transition range starting at a distance from the corner of one-fourth to one-third of the total length of the insert side.

* * * * *